United States Patent [19]

Miyoshi

[11] Patent Number: 4,953,984
[45] Date of Patent: Sep. 4, 1990

[54] OVERLOAD PREVENTING SYSTEM FOR KNEADING MACHINE

[75] Inventor: Tsuyoshi Miyoshi, Akashi, Japan

[73] Assignee: Kabushiki Kaisha Kobe Seiko Sho, Kobe, Japan

[21] Appl. No.: 383,623

[22] Filed: Jul. 24, 1989

[51] Int. Cl.$^5$ .............................................. B29B 1/06
[52] U.S. Cl. ...................................... 366/76; 366/97; 366/151
[58] Field of Search ................. 366/76, 77, 97, 98, 366/99, 151, 154, 155; 425/207, 208, 135

[56] References Cited

U.S. PATENT DOCUMENTS

| | | | |
|---|---|---|---|
| 2,446,657 | 8/1948 | MacLeod | 366/76 |
| 4,027,859 | 6/1977 | Stone | 366/151 |
| 4,818,113 | 4/1989 | Patel | 366/76 |

*Primary Examiner*—Robert W. Jenkins
*Attorney, Agent, or Firm*—Oblon, Spivak, McClelland, Maier & Neustadt

[57] ABSTRACT

A kneading machine has a cylinder formed with upper and lower ports for compressed fluid, a piston slidably fitted in the cylinder and having a weight connected to the underside thereof, a case disposed under the cylinder and having an upper opening to be closed and opened by the weight and kneader blades disposed within the case. An overload preventing system is provided and includes an upper pipe extending from a compressed fluid feed source to the upper port. A solenoid valve and the upper pipe selectively communicates the upper port with either the atmosphere or the compressed fluid feed source. Similarly, a lower pipe has a solenoid valve for selectively connecting the lower port to either the atmosphere or the compressed fluid feed source. A connecting pipe connects the upper and lower ports and includes a solenoid valve which selectively closes the connecting pipe. A kneader relay monitors the load of the motor which drives the kneader blades. When an overload is detected, the solenoid in the connecting pipe is opened so that the pressures on either side of the piston are equalized, thereby reducing the closing force of the weight and also reducing the motor load.

6 Claims, 3 Drawing Sheets

OVERLOAD PREVENTING SYSTEM FOR KNEADING MACHINE

BACKGROUND OF THE INVENTION

1. Field of the Invention

The present invention relates to an overload preventing system for a kneading machine which is for pulverizing and kneading rubber, plastics, etc.

2. Description of the Prior Art

In a kneading machine for pulverizing and kneading rubber, plastics, etc. (hereinafter referred to as "material to be kneaded, an overload is exerted on kneader blades and also on a drive means for the kneader blades in a pulverizing step of a pulverizing and kneading process for the material to be kneaded. To prevent such overload there has been proposed an overload preventing system for a kneading machine in which a load imposed on the above drive means is detected, and in response to the detected load a compressed fluid present at an upper side, or a lower side, in the interior of a lift cylinder for a weight which closes an upper opening of a case, is discharged into the atmosphere. As an example, this conventional overload preventing system will be described below with reference to FIG. 3.

In FIG. 3, a kneading machine to be prevented from overload by the overload preventing system shown therein is provided with a cylinder 51 which has at respective upper and lower positions an upper port 52 and a lower port 53 for inflow and outflow of compressed air. A piston 54 is slidably fitted inside the cylinder 51. To the underside of the piston 54 is fixed a piston rod 55 projecting downwards from a lower central part of the cylinder 51, and to the lower end of the piston rod 55 is fixed a weight 56 which is moved up and down by the piston 54. Under the cylinder 51 is disposed a frame 57 having an upper surface fixed to the lower surface of the cylinder 51 with the weight 56 being slidably fitted inside the frame 57. The frame 57 is provided exteriorly thereof with an inlet opening 58 for introducing a material to be kneaded into a case 59 which is fixed to the lower surface of the frame. An upper opening 60 of the case 59 is closed and opened by the weight 56 as the weight moves up and down. Within the case 59 are disposed kneader blades 61 of the kneading machine to pulverize and knead the material fed into the case, the kneader blades 61 being driven by an electric motor 62. For the kneading machine of the above construction, an upper pipe 64 is disposed, extending from a feed port 63 which is for the feed of compressed air up to the upper upper port 52. In the pipe 64 there is mounted an upper solenoid valve 65 which functions to respectively establish communication and cut off communication of the pipe 64 with respect to the with the upper port 52 and also functions to open the cylinder 51 side of the upper pipe 64 to the atmosphere. Also mounted in the upper pipe 64 is a pressure regulating valve 70 in a position closer to the feed port 63 with respect to the solenoid valve 65, the pressure regulating valve 70 functioning to regulate to a certain level the pressure of compressed air fed from the feed port 63 to the cylinder 51. Further, a lower pipe 66 is disposed, extending from the feed port 63 to the lower port 53, and in the lower pipe 66 there is mounted a lower solenoid valve 69 which functions to respectively establish communication and cut off communication of the feed port 63 with the lower port 53 and also functions to open the cylinder 51 side of the lower pipe 66 to the atmosphere. A meter relay 72 detects an electric current fed to the motor 62 when the motor drives the kneader blades 61 and operates the upper solenoid valve 65 reversibly in accordance with the detected current value.

In the above construction, with the weight 56 occupying an upper position in the frame 57, when a material to be kneaded is fed into the case 59 from the inlet opening 58, the upper solenoid valve 65 is operated to establish communication of the feed port 63 with the upper port 52. Then, compressed air the pressure of which has been adjusted to a predetermined certain level by the pressure regulating valve 70 is fed from the feed port 63 to the upper portion in the interior of the cylinder 51, so that the weight 56 is brought down to close the upper opening of the case 59. This closing force must be strong for the following reason. If the weight 56 should be pushed up easily by the force of a large lump of the material to be kneaded which is pulverized and moved by the kneader blades 61, the internal volume of the case 59 increases and hence the degree of freedom of the material to be kneaded increases, resulting in that the pulverizing and kneading efficiency for the material is deteriorated.

Pulverization of the material fed into the case is started by the kneader blades 61 which are driven by the electric motor 62. When the kneader blades 61 bite in a large lump of the material to be kneaded, an overload is exerted on both the kneader blades 61 and the motor 62. If no countermeasure is taken in this state, the kneader blades 61 and the motor 62 may be damaged. To prevent such overload, the electric current flowing through the motor 62 is detected by the meter relay 72, and when the detected current value exceeds the rated value of the motor 62, the exciting current for the upper solenoid valve 65 is cut off by the meter relay 72. As a result, the communication of the feed port 63 to the upper port 52 is cut off and the upper port 52 is opened to the atmosphere, whereby the compressed air present in the upper portion of the interior of the cylinder 51 is discharged into the atmosphere. Consequently, the closing force for the upper opening of the case 59 now corresponds to only the weight of the weight 56, so that a large lump of the material to be kneaded is pushed up with the operation of the kneader blades 61 and the internal volume of the case 59 increases, thus facilitating the movement of the material being kneaded, and hence the load imposed on the motor 62 is reduced. When the electric current flowing through the motor 62 has become smaller than the rated current value of the motor, the interception of the exciting current for the upper solenoid valve 65 is discontinued to reestablish communication of the upper port 52 with the feed port 63, whereby the passage leading to the atmosphere is cut off. Consequently, compressed air flows into the upper portion of the interior of the cylinder 51, so that the weight 56 strongly closes the upper opening 60 of the case 59. Thus, the reduction and reestablishment of the closing force of the weight 56 for the upper opening 60 of the case are repeated successively, whereby a large lump of the material to be kneaded is pulverized. Then, the operation shifts to the kneading step. The material to be kneaded in the kneading step is already of fine particles, so the kneader blades 61 and the motor 62 will no longer undergo an overload. When the kneading of the material to be kneaded is over, the exciting current for the upper solenoid valve 65 is cut off by a known means, whereby the compressed air present in the upper portion of the interior of the cylinder 51 is discharged into the atmosphere. At the same time, the lower solenoid valve 69 is energized by a known means to establish communication of the port 53 with the feed port 63 and cut off the passage leading to the atmosphere. Consequently, compressed air flows into the lower portion of the interior of the cylinder 51 from the feed port 63, thus causing the weight 56 to move upward. Now the pulverizing and kneading process for the material to be kneaded is over.

The kneading machine equipped with the overload preventing system according to the prior art described above in connection with FIG. 3 is useful in its own way and so is in wide use in the processing industry for rubber, plastics, etc. However, the following problems are still involved therein.

According to the above conventional overload preventing system, the depressing force for the weight to close the upper opening of the case is reduced by discharging into the atmosphere the compressed air of a volume corresponding to substantially the entire volume of the upper portion of the cylinder interior. Since this operation is repeated in the material pulverizing step, the amount of compressed air consumed is very large, thus resulting in a considerable energy loss.

Further, after the reduction of the closing force of the weight for the upper opening of the case, the compressed air is again fed to the upper portion of the interior of the cylinder through the upper solenoid valve, so it takes time for the closing force of the weight to reach a required closing force for not causing deterioration of the pulverizing efficiency. This time corresponds to a so-called time lag, which is large in the conventional overload preventing system described in connection with FIG. 3. Consequently, the time period in which a sufficient pulverizing force is not exerted on the material to be kneaded becomes long, thus leading to deterioration of the pulverizing efficiency.

SUMMARY OF THE INVENTION

Accordingly, it is the object of an present invention to remedy the above-mentioned problems of the prior art and provide an overload preventing system for a kneading machine with reduced energy loss and capable of quickening the reversion of the closing force of the weight after reduction thereof.

The above and other objects are achieved according to the present invention by a cylinder machine having a cylinder provided in upper and lower positions with upper and lower ports for inflow and outflow of compressed fluid, a piston slidably fitted in the cylinder and having a weight connected to the underside thereof, a case on which is erected the cylinder in a position where an upper opening of said case is closed and opened by said weight, and kneader blades disposed within the case. The kneading machine also has an overload preventing system including an upper pipe extending from the upper port to a compressed fluid feed source, the upper pipe having means for selectively cutting off communication between the upper port and the compressed fluid feed source, the upper pipe also having means for selectively opening the upper port to the atmosphere. Also provided is a lower pipe extending from the lower port to a compressed fluid feed source, the lower pipe having means for selectively cutting off communication between the lower port and the compressed fluid feed source, the lower pipe also having means for selectively opening the lower port to the atmosphere. Connecting means are provided for selectively connecting the upper port to the lower port such that compressed fluid in the upper port can flow into the lower port. Means are provided for detecting a load imposed on a drive means for driving the kneader blades while means are also provided for operating the connecting means for selectively connecting the upper port to the lower port in accordance with the load detected by the load detecting means.

According to a further feature of the invention, the means for selectively cutting off communication between the upper port and the compressed fluid feed source and the means for selectively opening the upper port to the atmosphere are together comprised by a single upper solenoid valve in the upper pipe. Similarly, the means for selectively cutting off communication between the lower port and the compressed fluid feed source and the means for selectively opening said lower port to the atmosphere are together comprised by a single lower solenoid valve in the lower pipe.

According to a further feature of the invention, the connecting means comprise a connecting pipe connected to the upper pipe and a connecting solenoid valve in the connecting pipe and comprising means for alternately connecting the lower port with one of the connecting pipe and the lower solenoid valve.

According to a further feature of the invention, the connecting means comprise a connecting pipe connected between the upper pipe and the lower pipe, an upper pipe connecting solenoid valve in the connecting pipe and comprising means for selectively closing the connecting pipe, and a lower connecting solenoid valve in the lower pipe and comprising means for selectively closing the lower pipe.

When a material to be kneaded is fed into the case, the upper pipe is brought into communication with compressed fluid while the connecting pipe is cut off, so that the compressed fluid flows into the upper portion of the interior of the cylinder through the upper port. On the other hand, the lower port of the cylinder is in communication with the atmosphere so that the weight is brought down by the piston and closes the upper opening of the case. Then, the kneader blades are driven by the drive means to start pulverization for the material fed into the case. If the kneader blades bite in a large lump of the material during the pulverization, an overload will be exerted on both the kneader blades and the drive means. However, the load imposed on the drive means is detected continually during the operation of the drive means, so in the event the detected load is an overload, the connecting pipe is opened in response to the overload to communicate with the upper port with the lower port. Consequently, the compressed fluid present on the upper port side of the cylinder flows into the lower portion of the interior of the cylinder through the connecting pipe, resulting in that the compressed fluid of the same pressure is present in both the upper and lower portions of the cylinder interior. That is, the closing force of the weight for the upper opening of the case is reduced to a level which corresponds to the difference between the own weight of the said weight and a value obtained by multiplying the sectional area of the rod portion of the piston by the pressure of the compressed fluid. By this reduced closing force the piston is held in a pressed condition against the lower end in the interior of the cylinder. The weight is pushed up by a large lump of the material to be kneaded which is moved by the kneader blades, thus facilitating the movement of the material to be kneaded, so that the load exerted on both the kneader blades and the drive means is reduced. When the thus-reduced load becomes smaller than the rated value of the drive means, the communication of the upper port connecting with the lower port is cut of by the operating and the lower port is again opened to the atmosphere, so that the compressed fluid present in the lower portion of the interior of the cylinder is discharged into the atmosphere. Every time an overload is exerted on the kneader blades and the drive means, the inflow of compressed fluid into the lower portion of the interior of the cylinder and the discharge thereof into the atmosphere from the lower portion of the cylinder interior are repeated. The material to be kneaded is solid and the load imposed on the kneader blades and the drive means is reduced as soon as the weight is pushed up to some extent, then the compressed fluid present on the lower side of the cylinder is discharged, the weight moves down, and the closing force of the weight for the upper opening of the case is restored. Thus the volume defined on the lower side of the cylinder interior is smaller that the internal volume of the cylinder. In the conventional overload preventing system shown in FIG. 3, after compressed fluid corresponding to the entire internal volume of the cylinder is discharged into the atmosphere, it is required to again supply the compressed fluid at a predetermined pressure. In comparison with this, according to the overload preventing system of the present invention, the amount of compressed fluid discharged is much smaller.

As previously noted, moreover, the reversion of the closing force of the weight for the upper opening of the case is realized upon completion of the discharge of compressed fluid on the lower side of the cylinder interior without the need of supplying compressed fluid in a volume nearly equal to the entire internal volume of the cylinder as in the conventional overload preventing system illustrated in FIG. 3. Therefore, the time required for reversion of the closing force of the weight for the upper opening of the case is shortened.

DESCRIPTION OF THE PREFERRED EMBODIMENTS

Figure 1:
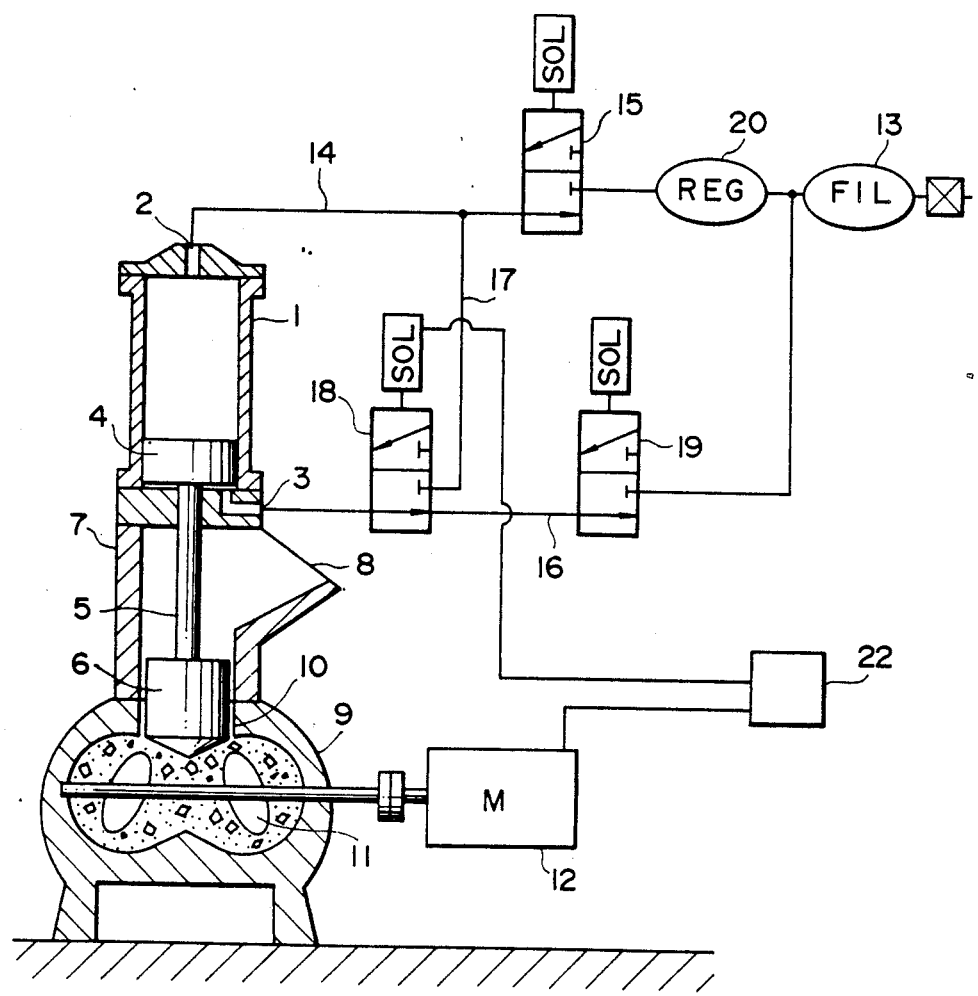
FIG. 1 is a sectional front view of an overload preventing system for a kneading machine according to a first embodiment of the present invention.
Figure 2:
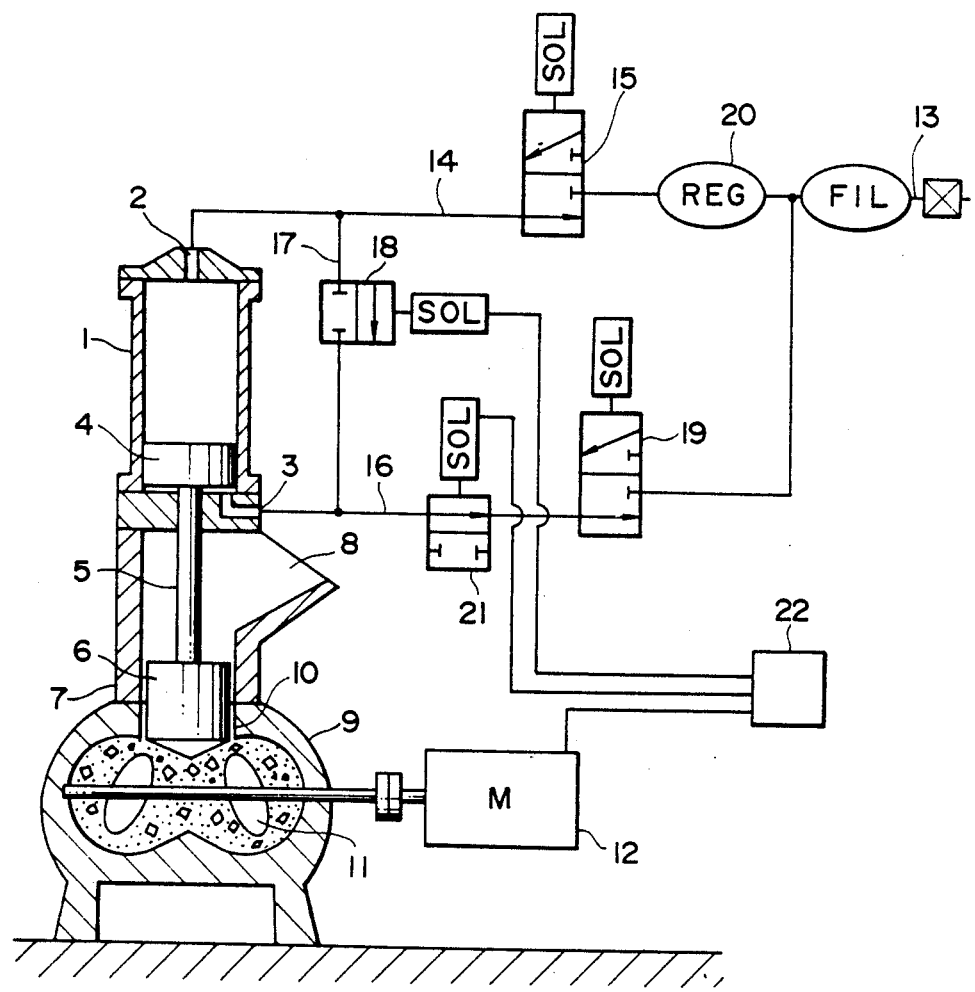
FIG. 2 is a sectional front view of an overload preventing system for a kneading machine according to a second embodiment of the present invention.

Embodiments of the present invention will be described hereinunder with reference to FIGS. 1 and 2.

First Embodiment

A first embodiment of the present invention will now be described with reference to FIG. 1. In FIG. 1, the numeral 1 denotes a cylinder, with an upper port 2 for inflow and outflow of compressed air being formed in the top of the cylinder and a lower port 3 formed in the outer periphery of the lower portion thereof. In the interior of the cylinder 1 there is provided a piston 4 which is moved up and down by compressed air fed and discharged through the upper and lower ports 2, 3 and which is fitted in the cylinder along the inner surface thereof. To the underside of the piston 4 is fixed one end of a piston rod 5, the other end of which projects downwards from the lower portion of the cylinder 1. To the other end, or the lower end, of the piston rod 5 is fixed a weight 6 which is moved up and down by the piston 4. Under the cylinder 1 is disposed a frame 7 having an upper surface fixed to the lower surface of the cylinder 1 and also having an inlet opening 8 for feeding a material to be kneaded into a case 9 which is fixed to the lower portion of the frame, with the weight being vertically movably fitted inside the frame 7. The case 9 has an upper opening 10 which is closed and opened by the weight 6 with vertical movements of the weight, and in the interior of the case 9 there are disposed kneader blades 11 which are driven by an electric motor 12 disposed outside the case 9 for pulverizing and kneading the material fed into the case 9 from the inlet opening 8. For the kneading machine of such construction, an upper pipe 14 is disposed outside the kneading machine, extending to the upper port from a feed port 13 for supplying compressed air to the cylinder 1, and in the upper pipe 14 there is mounted an upper solenoid valve 15 for respectively establishing communication and cutting off communication of the feed port 13 and the upper port 2, and also for opening the upper port 2 side of the cylinder 1 to the atmosphere. There is also mounted in the upper pipe 14 a pressure regulating valve 20 in a position closer to the feed port 13 with respect to the upper solenoid valve 15, the pressure regulating valve 20 functioning to adjust to predetermined certain level the pressure of compressed air to be fed to the cylinder 1. Further, a lower pipe 16 is disposed, extending from the feed port 13 to the lower port 3, and in the lower pipe 16 there is mounted a lower solenoid valve 19 which functions to establish communication and cut off communication of the feed port 13 and the lower port 3 and also functions to open the lower port 3 to the atmosphere. There is also disposed a connecting pipe 17 extending from the upper pipe 14 in a position on the cylinder 1 side with respect to the upper solenoid valve 15 to the lower pipe 16 in a position on the cylinder 1 side with respect to the lower solenoid valve 19. At the connection of the pipes 16 and 17 there is disposed an upper connection solenoid valve 18 which functions to establish communication and cut off communication of the connecting pipe 17 to the lower port 3 and also functions to cut off communication and establish communication between the lower solenoid valve 19 and the lower port 3. Further, to the motor 12 is connected a meter relay 22 for detecting a current value during operation of the motor and operating the upper connection solenoid valve 18 in accordance with the detected current value, the output side of the meter relay 22 being connected to the solenoid valve 18.

In operation, by operation of the upper solenoid valve 15 the passage extending from the feed port 13 to the cylinder 1 is cut off and the passage leading to the atmosphere is opened on the cylinder 1 side of the upper pipe 14, and by operation of the upper connection solenoid valve 18 the passage from the connecting pipe 17 to the lower pipe 16 is cut off and there is establish communication of the passage from the cylinder 1 to the lower solenoid valve 19. Further, by operation of the lower solenoid valve 19 the passage from the cylinder 1 to the atmosphere is cut off and there is established communication from the feed port 13 to the cylinder 1, whereupon compressed air flows into the lower portion of the interior of the cylinder 1, so that the weight 6 rises to open the upper opening 10 of the case 9. Then, when a material to be kneaded is fed from the inlet opening 8, the passage in the lower solenoid valve 19 from the feed port 13 to the cylinder 1 is cut off and the passage to the atmosphere on the cylinder 1 side is opened. Further, by the upper solenoid valve 15 the passage to the atmosphere on the cylinder 1 side is cut off and there is made communication of the pressure regulating valve 20 to the cylinder 1. As a result, compressed air whose pressure has been regulated by the pressure regulating valve 20 flows into the upper portion of the interior of the cylinder 1, so that the weight 6 goes down and continues to close the upper opening 10 of the case 9 with a predetermined closing force. Then, when the kneader blades 11 are driven by the motor 12 to start pulverization of the material to be kneaded, an overload is exerted on both the motor 12 and the kneader blades 11. As well known, the electric current flowing in the motor 12 increases or decreases depending on the load imposed on the motor, so in this case the electric current flowing in the motor 12 increases. The current value is detected by the meter relay 22. When the detected current value exceeds the rated value of the motor 12, the meter relay 22 actuates the upper connection solenoid valve 18, so that the passage leading form the lower port 3 to the atmosphere via the upper connection solenoid valve 18 is cut off and there is made communication of the passage from the connecting pipe 17 to the lower port 3. Consequently, the compressed air present in the upper portion of the interior of the cylinder 1 flows into the lower portion of the cylinder interior through the connecting pipe 17 and the upper connection solenoid valve 18, so that the closing force of the weight 6 for the upper opening 10 of the case 9 is reduced to a force which corresponds to the different between the weight of the weight 6 and a force obtained by multiplying the sectional area of the piston rod 5 by the pressure of the compressed air. The weight 6 is pushed up by a large lump of the material to be kneaded which is moved by the kneader blades 11, so the internal volume of the case 9 increases and the material in the form of a large lump becomes easier to move, resulting in that the load exerted on the kneader blades 11 is reduced and the value of the electric current flowing in the motor 12 also decreases. When the current value decreases to below the rated value of the motor 12, the upper connection solenoid value 18 is operated reversely by the meter relay 22; that is, the passage from the connecting pipe 17 to the lower pipe 16 in the upper connection solenoid valve 18 is cut off and there is established communication by the upper connection solenoid valve 18 between the lower port 3 and the atmosphere via the lower solenoid valve 19. As a result, the compressed air present in the lower portion of the interior of the cylinder 1 is discharged into the atmosphere, and upon completion of the discharge the closing force of the weight 6 for the upper opening 10 of the case 9 reverts to a predetermined closing force. The material pulverizing step is completed by the repetition of these operations, then the process shifts to the material kneading step, and in this way the pulverizing and kneading process for the material to be kneaded is completed. In the kneading step, the material to be kneaded is already fine in particle size, so there is no fear of the overload being exerted on the kneader blades 11 and the motor 12.

Upon completion of the pulverizing and kneading process, the upper and lower solenoid valves 15 and 19 are operated reversely by known means, so that the weight 6 is moved upwards, and the kneading machine is now ready to start the next pulverizing and kneading process for the material to be kneaded.

The solenoid valves must be operated in a predetermined order with the lapse of time. As means for such operation there may be used known means, for example, using a relay and a timer in an electric circuit for actuating each solenoid valve.

Second Embodiment

A second embodiment will now be described with reference to FIG. 2. For the kneading machine described in the second embodiment, an upper pipe 14 is disposed, extending from the feed port 13 to the upper port 2, and in the upper pipe 14 there is mounted an upper solenoid valve 15 for opening the cylinder 1 to the atmosphere, and a pressure regulating valve 20 for adjusting to a predetermined certain level the pressure of compressed air fed from the feed port 13 and flowing toward the cylinder 1 is also mounted in the upper pipe 14 in a position close to the feed port 13 with respect to the upper solenoid valve 15. Further, a lower pipe 16 is disposed, extending from the feed port 13 to the lower port 3, and in the lower pipe 16 there is mounted a lower solenoid valve 19 for establishing communication and cutting off communication of the cylinder 1 with the feed port 13 and also for opening the cylinder to the atmosphere. A lower connection solenoid valve 21 for establishing communication and cutting off communication of the lower port 3 with the lower solenoid valve 19 is also mounted in the lower pipe 16 in a position closer to the cylinder 1 with respect to the lower solenoid valve 19. Moreover, a connecting pipe 17 is disposed, extending from the upper pipe 14 in a position closer to the upper port 2 with respect to the upper solenoid valve 15 to an upper connection solenoid valve 18 for establishing communication and cutting off communication of the connecting pipe 17 with the lower connecting pipe 16.

Further, to the electric motor 12 is connected a meter relay 22 for detecting an electric current value during operation of the motor and for actuating a solenoid valve in accordance with the detected current value, and the output side of the meter relay 22 is connected to both the upper and lower connection solenoid valves 18 and 21.

In the overload preventing system of the second embodiment, when the upper and lower connection solenoid valves 18 and 21 are actuated by the meter relay 22 which operates in accordance with the value of the electric current flowing in the motor 12, the reduction and reversion of the closing force of the weight 6 for the upper opening 10 of the case 9 are repeated alternately, whereby the material to be kneaded is pulverized and then kneaded, as explained in the first embodiment. And this should be readily understood.

Although in the above two embodiments the connecting pipe 17 and the upper pipe 14 are connected together in a position closer to the cylinder 1 with respect to the upper solenoid valve 15, this connection may be done in any position on the cylinder 1 side with respect to the pressure regulating valve 20. Therefore, even if the said connection is in a position between the pressure regulating valve 20 and the upper solenoid valve 15 or directly to the upper port 2 of the cylinder 1, there will be no change in the resulting effect and function.

Moreover, although as the upper and lower solenoid valves 15 and 19 there were adopted solenoid valves each having both the function of making communication and cutting off communication of the associated pipe and the function of opening the associated pipe portion on the cylinder 1 side into the atmosphere, each such solenoid valve may be substituted by two solenoid valves having the respective functions just mentioned above. This should be readily understood.

Further, although the load imposed on the electric motor 12 was detected in terms of the value of the electric current flowing in the motor, a torque meter may be disposed of the same purpose between the motor 12 and the kneader blades 11, and also in this case there will be no change in the resulting effect and function.

Figure 3:
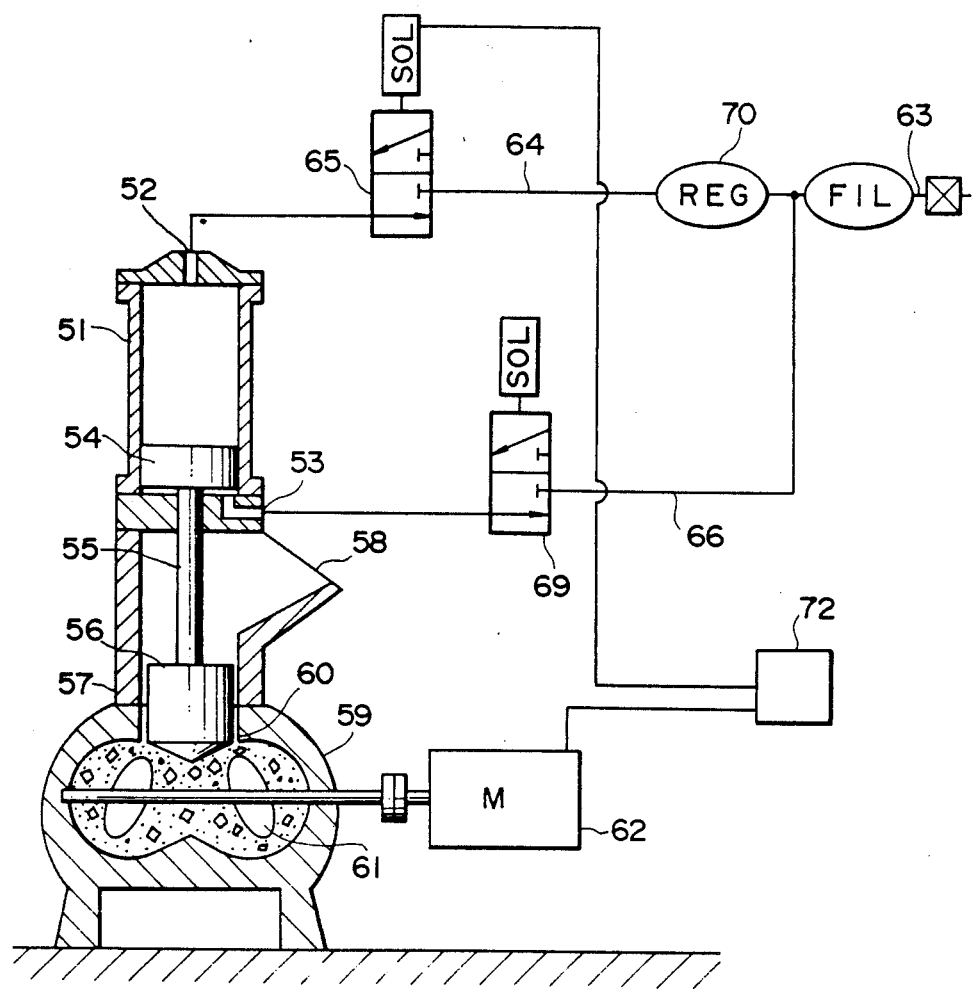
FIG. 3 is a sectional front view of an overload preventing system for a kneading machine according to the prior art.

In the overload preventing system for a kneading machine according to the present invention, as set forth hereinabove, the closing force of the weight for the upper opening of the case is reduced by introducing the compressed fluid which is fed to the upper portion of the interior of the cylinder into the lower portion of the cylinder interior. Consequently, the closing force of the weight is reduced to a force which is the difference between the weight of the weight and a value obtained by multiplying the sectional area of the piston rod by the pressure of the compressed fluid. Since the thus reduced closing force still acts downwards, even when the weight is pushed up by a large lump of the material to be kneaded which is moved by the kneader blades, the amount thereof pushed up is small and so the weight is held substantially in the lower-end position of the cylinder. Also when the compressed fluid which has been introduced into the lower portion of the interior of the cylinder is discharged into the atmosphere, the volume of the compressed fluid discharged is very small as compared with that in the conventional overload preventing system shown in FIG. 3 wherein compressed fluid of a volume corresponding substantially to the whole of the internal volume of the cylinder is discharged into the atmosphere for reducing the closing force of the weight.

Further, the reversion of the closing force of the weight for the upper opening of the case is realized by discharging into the atmosphere the small volume of compressed fluid present on the lower side of the interior of the cylinder without the need of feeding compressed fluid of a volume corresponding substantially to the internal volume of the cylinder to the upper side of the cylinder interior. Thus, by reducing the closing force of the weight for the upper opening of the case, overloading is prevented and the time required for reversion to a predetermined closing force is shortened.

According to the present invention, therefore, there can be provided an overload preventing system for a kneading machine with less energy loss and capable of enhancing the pulverizing efficiency for a material to be kneaded.

What is claimed is:

1. In a kneading machine having a cylinder provided in upper and lower positions with upper and lower ports for inflow and ouflow of compressed fluid, a piston slidably fitted in the cylinder and having a weight connected to the underside thereof, a case on which is erected the cylinder in a position where an upper opening of said case is closed and opened by said weight, and kneader blades disposed within said case, an overload preventing system including:
   an upper pipe extending from said upper port to a compressed fluid feed source, said upper pipe having means for selectively cutting off communication between said upper port and said compressed fluid feed source, said upper pipe also having means for selectively opening said upper port to the atmosphere;
   a lower pipe extending from said lower port to a compressed fluid feed source, said lower pipe having means for selectively cutting off communication between said lower port and said compressed fluid feed source, said lower pipe also having means for selectively opening said lower port to the atmosphere;
   connecting means for selectively connecting said upper port to said lower port such that compressed fluid in said upper port can flow into said lower port;
   means for detecting a load imposed on a drive means for driving said kneader blades; and
   means for operating said connecting means for selectively connecting said upper port to said lower port in accordance with the load detected by said load detecting means,
   whereby compressed fluid can be transferred from said upper port to said lower port when an overload is detected so that a force applied by said weight to said casing is reduced.

2. The kneading machine of claim 1 wherein said means for selectively cutting off communication between said upper port and said compressed fluid feed source and said means for selectively opening said upper port to the atmosphere are together comprised by a single upper solenoid valve in said upper pipe.

3. The kneading machine of claim 2 wherein said means for selectively cutting off communication between said lower port and said compressed fluid feed source and said means for selectively opening said lower port to the atmosphere are together comprised by a single lower solenoid valve in said lower pipe.

4. The kneading machine of claim 3, wherein said connecting means comprise:
   a connecting pipe connected to said upper pipe; and
   a connecting solenoid valve in said lower pipe and comprising means for alternately connecting said lower port with one of said connecting pipe and said lower solenoid valve.

5. The kneading machine of claim 3, wherein said connecting means comprise:
   a connecting pipe connected between said upper pipe and said lower pipe; and
   an upper connecting solenoid valve in said connecting pipe and comprising means for selectively closing said connecting pipe.

6. The kneading machine of claim 5, wherein said connecting means further comprise a lower connecting solenoid valve in said lower pipe and comprising means for selectively closing said lower pipe.

* * * * *